Dec. 8, 1970      L. M. LEIBOWITZ ET AL      3,546,585
SHORT DURATION SIGNAL BURST FREQUENCY METER
Filed Oct. 21, 1968      2 Sheets-Sheet 2
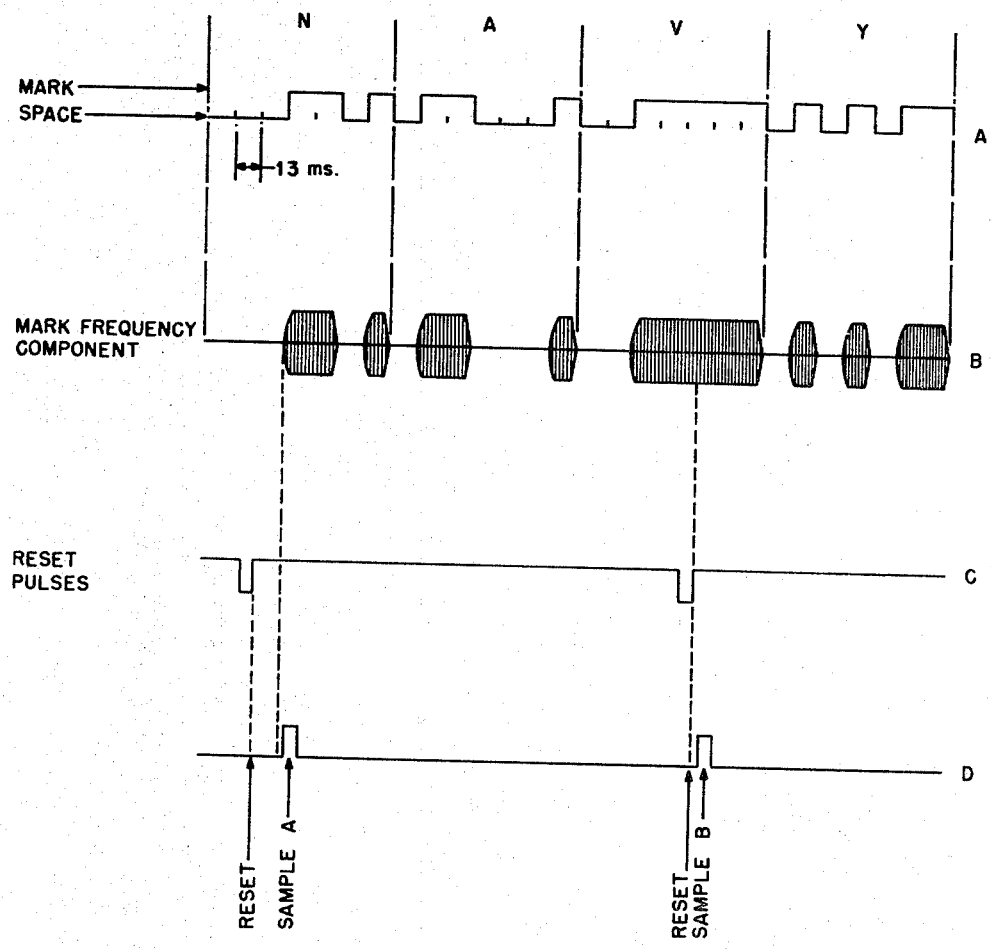
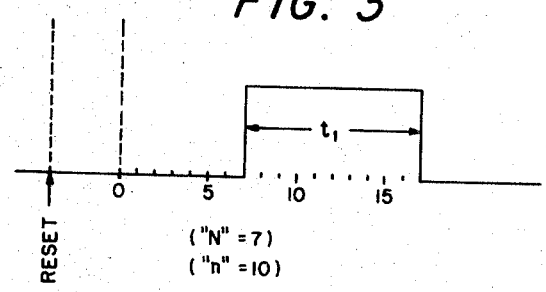
INVENTORS
LAWRENCE M. LEIBOWITZ
BERNARD A. TRETICK
BY
ATTORNEY

3,546,585
SHORT DURATION SIGNAL BURST FREQUENCY METER

Lawrence M. Leibowitz, Fairfax, Va., and Bernard A. Tretick, Silver Spring, Md., assignors to the United States of America as represented by the Secretary of the Navy
Filed Oct. 21, 1968, Ser. No. 769,341
Int. Cl. G01r 23/14
U.S. Cl. 324—79       4 Claims

ABSTRACT OF THE DISCLOSURE

A frequency meter for measuring the error in frequency of short signal bursts, especially multiplexed Teletype signals, which device converts the frequency of the signals to be measured, counts the number of zero-crossings of the converted signal, measures the difference in time of occurrence between two predetermined counts, and displays the resultant frequency error signal in a readout device.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a frequency meter and more particularly to a new and improved system for precisely measuring the frequency of signals of very short duration, such as multiplexed Teletype signals and the like.

In the field of frequency measuring, it has been the general practice to employ various types of digital frequency counting devices, as exemplified by U.S. Pat. No. 2,919,402 to Hanlet et al. Although such devices have served the purpose, they have not proved entirely satisfactory under all conditions of service for the reason that considerable difficulty has been encountered in precisely measuring the frequency of those signals which have extremely short durations. Certain Teletype signals, for example, used by the United States Navy, contain 32 components which appear as audio tones ranging in frequency from 382.5 hertz to 3,017.5 hertz, at 85 hertz intervals. Each adjacent pair of tones represents one channel, in which the higher frequency tone identifies a "mark" and the associated lower frequency tone identifies a "space." At a keying rate of 100 words per minute per channel, for example, the "mark" or "space" frequency components will appear at their respective frequencies for only approximately 13 milliseconds. Of this period, about 3 milliseconds must be disregarded in order to allow time for the switching transients to be dissipated. The operational need for rapid, precise on-line monitoring of the frequency of each component of such Teletype signals has been a critical problem confronting engineers which has not heretofore been effectively solved by the prior art thereby hindering the growth of many advanced communications systems.

SUMMARY OF THE INVENTION

The general purpose of this invention is to provide a frequency meter which embraces all the advantages of similarly employed prior art devices and possesses none of aforedescribed disadvantages. The invention contemplates use of the relationship between the frequency of a signal and the time duration of a predetermined number of cycles of the signal. It has been found that by converting the frequency of short duration Teletype signals and by appropriately measuring the time of occurrence of a representative number of cycles of the converted signal which contains any error present in the original signal, a time error signal can be displayed which is very nearly equal to the frequency error, from a nominal frequency, of the input signals. To attain this, the present invention uses frequency mixing and filtering devices, in combination with precise digital timing and counting circuitry, to generate a start-stop pulse for time interval measurement. A time interval measurement readout circuit provides instant display of the error in the various tone frequencies.

Accordingly, one object of the present invention is to measure the frequency of signals having a short duration.

Another object is the provision of a device for measuring the frequency of various signal bursts having widely differing frequencies.

A still further object is to accurately measure the frequency of multiplex Teletype signals.

These and other objects, advantages and novel features of the invention will become apparent from the following detailed description of the invention when considered in conjunction with the accompanying drawings wherein:

FIG. 2 shows various signal graphs used to explain the operation of the system of FIG. 1; and FIG. 3 is an enlarged portion of one of the graphs of FIG. 2.

DESCRIPTION OF THE PREFERRED EMBODIMENT

Figure 1:
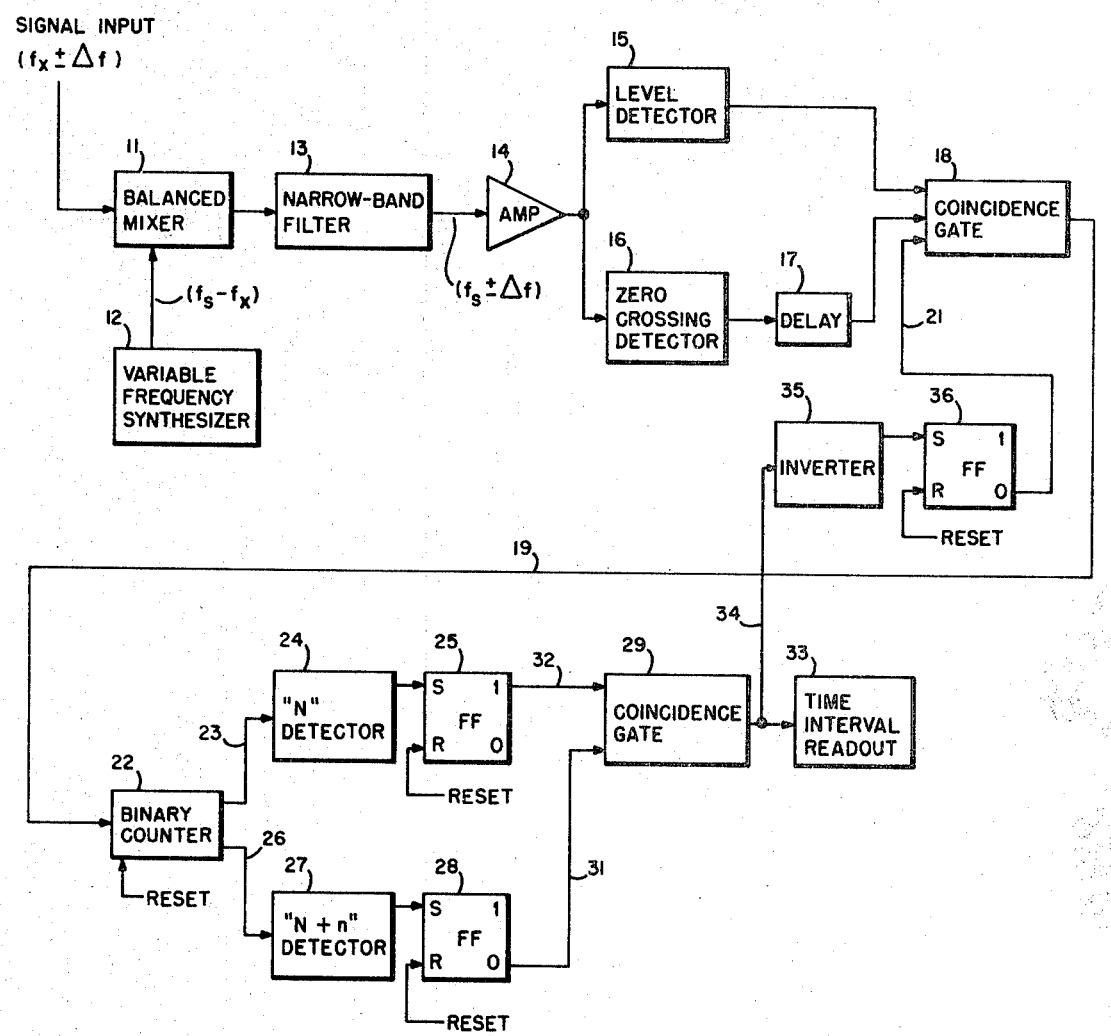
FIG. 1 is a block diagram of the preferred embodiment of the invention.

Referring now to FIG. 1, the short duration input signal bursts are applied to balanced mixer 11 where they are converted in frequency by the interaction of the output signal from variable frequency synthesizer 12. The input signal may be the 32 component Teletype signal described above, in which case the input signal burst component to be measured can be represented as having a frequency which is the sum of a known nominal component $f_x$ and a deviation component $\pm \Delta f$. The output of variable frequency synthesizer 12 is programmed to have a frequency equal to $f_s - f_x$, where $f_s$ is a predetermined fixed frequency which is correlated to the time interval measuring circuitry to be described more fully below, so that the mixer 11 will produce output signals which are equal to $(f_s \pm \Delta f)$ and $(f_s - 2f_x \pm \Delta f)$; i.e., the sum and difference of the two input signals. The signal is fed to narrow-band filter 13 which only passes the sum component, $(f_s \pm \Delta f)$. The filtered signal is then amplified by amplifier 14 and is fed to both level detector 15 and zero-crossing detector 16. The output from zero-crossing detector 16 is delayed by delay circuit 17 and is coupled to one input of coincidence gate 18. Coincidence gate 18 also receives the signal produced by level detector 15 to produce an output pulse signal on line 19 only upon the coincident receipt of the signals from both level detector 15 and zero-crossing detector 16. The coincidence gate 18 also receives an input signal on line 21 which serves to deactivate or block the gate 18 during certain periods, to be explained below.

The level detector 15 produces an output signal only when the input is above a predetermined amplitude. Since the output signals from narrow-band filter 13 include various spurious signals which are attenuated below the triggering level of detector 15 in addition to the desired frequency signal, $(f_s \pm \Delta f)$ the level detector serves to discriminate against those signals and to produce an output signal which occurs only once during each cycle of the desired signal ($f_s \pm \Delta f$). It can be seen that the number of pulses appearing at the output of the detector per unit of time would normally provide an accurate indication of the frequency of the converted input signals. However, due to the variation in amplitude of signals transmitted over long distances caused by multipath propagation interference and the like, each output pulse from detector 15 may occur at a different time in each cycle of the signal. Consequently, the output of the detector alone will not suffice where accurate time measurement techniques are to be employed. For this reason, zero-crossing detector 16 is utilized to provide an output pulse each time the output signal from amplifier 14 crosses the zero amplitude axis in a positive-going direction. The coincident receipt of both the level detector output and the delayed zero-crossing detector output assures that the frequency of the pulse signals appearing on line 19 is accurately representatively of the frequency of the converted input signal component ($f_s \pm \Delta f$) and is free from other signal components which may pass through narrow-band filter 13.

Continuing with FIG. 1, the pulse train on line 19 is fed to a binary counter 22 which counts the number of pulses in the pulse train. After a fixed predetermined number of counts, designated as "N," the counter 22 produces an output signal on line 23 which is detected by "N" detector 24 which, upon receipt of the "Nth" count, sends a triggering pulse to the "set" input of conventional flip-flop circuit 25. After the counter 22 registers an additional number of counts, designated as "n," an output signal is fed via line 26 to "N+n" detector 27 which then sends a pulse to the set input of flip-flop 28, in similar manner to the operation of detector 24 and flip-flop 25. The "1" output of flip-flop 25 and the "0" output of flip-flop 28 are connected to the inputs of coincidence gate 29 which produces an output signal whenever both input signals are present. Flip-flops 25 and 28 are reset prior to measurement by a common reset pulse such that an output pulse appears on the "0" output of both circuits. Therefore, since a pulse appears on line 31 and not on line 32, no output signal will appear at the output of gate 29. Since the first part of any short duration signal burst contains many undesirable transients, the device is designed to count pulses only after the "Nth" pulse. When "N" detector 24 sets flip-flop 25, to thereby produce a signal on line 32, gate 29 produces an output signal. This signal continues until the "N+nth" pulse is detected by detector 27 to set flip-flop 28, which removes the signal on line 31 and inhibits the gate 29. The output from gate 29 is fed to time interval readout circuit 33 which measures and records its duration time which is proportional to and therefore indicative of the frequency of the ($f_s \pm \Delta f$) component. The output pulse is also fed via line 34 and inverter 35 to the set input of flip-flop 36. Flip-flop 36 is reset by the common reset pulse such that a signal appears on its "0" output prior to and during the measurement count, which signal enables coincidence gate 18. Flip-flop 36 will change its state from "0" to "1" upon a positive-going transition of the signal from inverter 35, which occurs when the output pulse from gate 29 terminates. When the output pulse from gate 29 terminates, flip-flop 36 becomes "set," the signal on line 21 disappears, and gate 18 becomes disabled until the system is reset for another measurement.

Referring now to FIG. 2, curve A represents a typical "mark-space" Teletype coded word. The curve shows the letters N-A-V-Y and their corresponding code. As explained above, for each of the 16 channels in a Teletype system, the "mark" interval is characterized by the presence of the higher of an adjacent pair of audio tones while the "space" interval is recognized by the lower tone. Each alphanumeric character is formed by a combination of seven 13-millisecond (at 100 w.p.m.) duration bursts of "mark" and "space" tones, as illustrated. The "mark" frequency component is shown diagrammatically by curve B. Curve C shows two exemplary reset pulses which are applied to binary counter 22 and flip-flops 25, 28, and 36, as shown in FIG. 1. After the system is reset, and variable frequency synthesizer 12 is programmed to frequency ($f_s - f_x$), where $f_x$ is the known nominal frequency of the "mark" component shown in curve B, binary counter 22 will count the cycles of the signal derived from the "mark" signal as they are received. Curve D shows the output pulse from gate 29 which has a time duration equal to the time duration of "n" pulses from counter 22.

Sample A in curve D is shown enlarged in FIG. 3 and illustrates the operation of the system. After the system is reset, the counter 22 is ready to receive the pulse output from gate 18 which has been enabled by flip-flop 36. The numbers shown in FIG. 3 represent the number of pulses applied to counter 22 and consequently the number of cycles of the signal $f_s \pm \Delta f$. In the illustrated example, "N" equals 7 and "n" equals 10. It is noted that "N" is selected so that the sampling count will not begin until all transients have died out. Therefore after the 7th or "Nth" pulse, coincidence gate 29 produces a signal ten cycles long which lasts until the 17th or "N+nth" pulse whereupon the system is disabled until another reset pulse is generated, as shown in curves C and D of FIG. 2. The frequency of the signal burst on line 19 ($f_s \pm \Delta f$) is related to the width or time duration $t_1$ of the ten cycle output pulse from gate 29, as shown in FIG. 3, by the formula $$t_1 = \frac{n}{f_s \pm \Delta f}$$

In the illustrated example, the pulse count $n=10$ so that:

$$t_1 = \frac{10}{10,000 \pm \Delta f} \approx 1000 \pm \Delta t \mu s$$

where the 1000 $\mu s$ "component" is the nominal time duration measurement and $\Delta t$ is the time deviation component. It is noted that $f_s$ can be any convenient frequency, however, its selection will affect the magnitude of the nominal time duration component of readout device 33 from which the error measurement is made. In addition, for the 10 kHz. nominal frequency used above for $f_s$, a direct equivalence between the frequency deviation component $\Delta f$ and the time interval deviation component $\Delta t$ can be assumed and, if so, results in a small measurement error that increases nearly linearly as $\Delta f$ increases. For example, where $\Delta f = \pm 40$ Hz. (which is the maximum meaningful error in a Teletype system having 85 Hz. tone signal separation) the measurement error in assuming that $\Delta f$ equals $\Delta t$ is 0.4%; for $\Delta f = \pm 1.0$ Hz., the error will be only 0.01%. Thus, if it is desired to measure the precise frequency of a short signal burst corresponding to the "mark" component of the first channel of a 16 channel Teletype system, where $f_x$ (the known nominal frequency) is equal to 467.5 Hz., frequency synthesizer 12 would be programmed to produce a signal having a frequency equal to ($f_s - f_x$) or $(10,000 - 467.5) = 9,532.5$ Hz., where $f_s$ is selected to be 10 kHz. The output from filter 13 will therefore equal ($10,000 \pm \Delta f$), where $\Delta f$ is the deviation in frequency of the input signal from the nominal value of 467.5 Hz. Since $f_s = 10,000$ Hz., $t_1$ will be equal to ($1000 \pm \Delta t - s$) which approximately equals ($1000 \pm \Delta f \mu s$). Therefore, the deviation from 1000 $\mu s$ of the readout signal from time interval readout circuit 33 directly indicates the error in frequency of the "mark" signal burst.

It can be seen that by measuring the deviation in the duration of the output pulse from gate 29, the frequency deviation of a short duration signal burst having a known nominal frequency can be easily and accurately determined. It should be noted that an accurate frequency measurement can be made by the aforedescribed invention by sampling only ten cycles of the converted input signal, as in the example.

The system thus provides accurate and continuous on-line monitoring of the frequency of incoming signal bursts of short duration and provides a direct readout of the frequency error of the measured signal.

It should be understood, of course, that the foregoing disclosure relates to only a preferred embodiment of the invention and that numerous modifications or alterations may be made therein without departing from the spirit and scope of the invention as set forth in the appended claims.

What is claimed and desired to be secured by Letters Patent of the United States is:

1. A frequency measuring circuit for measuring the frequency of a short duration signal burst which frequency is the sum of a known nominal frequency component and an unknown deviation frequency componet comprisig:
   a variable frequency synthesizer for producing a stable output signal;
   a frequency mixer adapted to receive said short duration signal bursts and the output from said frequency synthesizer;
   a narrow-band filter coupled to said frequency mixer for producing an output signal having a frequency which is the sum of a predetermined fixed-frequency signal and said unknown deviation frequency component;
   a level detector coupled to said filter for producing an output signal whenever the amplitude of the output signal of said filter is above a predetermined level;
   a zero-crossing detector coupled to said filter for producing an output signal whenever the output signal of said filter changes polarity in one direction;
   enabling pulse generator means for producing an output pulse to thereby enable said frequency measuring circuit;
   a coincidence gate coupled to receive the output signals from said level detector, said zero-crossing detector, and said enabling pulse generator means for producing an output pulse upon the coincident receipt of output signals from said level detector, said zero-crossing detector, and said enabling pulse generator means;
   counter means coupled to said coincidence gate for counting the output pulses from said coincidence gate and producing a first count output pulse at a predetermined count and a second count output pulse at a higher predetermined count;
   circuit means coupled to receive said first and second count output pulses for producing an output pulse having its pulse width determined by the difference in the time of occurrence of said first and second count pulses and thereby proportional to the frequency of the output signal of said narrow-band filter; and
   time interval readout means adapted to receive said output pulse from said circuit means for displaying the unknown deviation frequency component of said short duration signal bursts.

2. The circuit as in claim 1 which further includes:
   means for applying the output pulse from said circuit means to said enabling pulse generator means so as to deactivate said enabling pulse generator means when the output pulse from said circuit means terminates.

3. A circuit for measuring the frequency of a short duration signal burst, said frequency being the sum of an approximate frequency and a deviation frequency, comprising:
   frequency conversion means adapted to receive said short duration burst for producing an indication of the approximate frequency of said short duration signal burst and an output signal having a frequency which is the sum of a predetermined known frequency and the deviation frequency of said short duration signal burst and including a frequency synthesizer for producing a signal having a frequency equal to the difference between said predetermined known frequency and said approxiate frequency; a frequency mixer adapted to receive said signal burst and the signal from said frequency synthesizer; and a narrow-band filter coupled to said frequency mixer;
   signal detector means coupled to said frequency conversion means for producing a series of output pulses having a frequency determined by the frequency of the output signal from said frequency conversion means and including a level detector and a zero-crossing detector both coupled to receive the output from said frequency conversion means, and further including a coincidence gate coupled to at least said level detector and said zero-crossing detector and delay means coupled between said zero-crossing detector and said coincidence gate for delaying the output signals from said zero-crossing detector by a predetermined fixed time;
   counter means coupled to the coincidence gate of said signal detector means for counting the output pulses from said coincidence gate and producing a first count output pulse at a predetermined count and a second count output pulse at a higher predetermined count;
   circuit means coupled to receive said first and second count output pulses for producing an output pulse having its pulse width determined by the difference in time of occurrence of said first and second count pulses and thereby proportional to the frequency of the output signal of said frequency conversion means; and
   time interval readout means adapted to receive said output pulse from said circuit means for displaying the frequency of said frequency component.

4. A circuit for measuring the frequency of a short duration signal burst, said frequency being the sum of an approximate frequency and a deviation frequency, comprising:
   frequency conversion means adapted to receive said short duration burst for producing an indication of the approximate frequency of said short duration signal burst and an output signal having a frequency which is the sum of a predetermined known frequency and the deviation frequency of said short duration signal burst and including a frequency synthesizer for producing a signal having a frequency equal to the difference between said predetermined known frequency and said approximate frequency; a frequency mixer adapted to receive said signal burst and the signal from said frequency synthesizer; and a narrow-band filter coupled to said frequency mixer;
   signal detector means coupled to said frequency conversion means for producing a series of output pulses having a frequency determined by the frequency of the output signal from said frequency conversion means and including a level detector and a zero-crossing detector both coupled to receive the output from said frequency conversion means, and further including a coincidence gate coupled to at least said level detector and said zero-crossing detector;
   counter means coupled to the coincidence gate of said signal detector means for counting the output pulses from said coincidence gate and producing a first count output pulse at a predetermined count and a second count output pulse at a higher predetermined count;
   circuit means coupled to receive said first and second count output pulses for producing an output pulse having its pulse width determined by the difference in time of occurrence of said first and second count pulses and thereby proportional to the frequency of the output signal of said frequency conversion means;

disabling circuit means coupled between said circuit means and said coincidence gate to disable said signal detector means when the output pulse from said circuit means terminates and time interval readout means adapted to receive said output pulse from said circuit means for displaying the frequency of said frequency component.

References Cited

UNITED STATES PATENTS 3,365,716  1/1968  Jorgensen _____ 324—78

ALFRED E. SMITH, Primary Examiner

U.S. Cl. X.R.

328—141